United States Patent
Schrum et al.

(10) Patent No.: US 12,423,293 B2
(45) Date of Patent: Sep. 23, 2025

(54) STREAMING CHANGE LOGS FROM STREAMING DATABASE TABLES

(71) Applicant: Oracle International Corporation, Redwood Shores, CA (US)

(72) Inventors: Allan George Schrum, Bozeman, MT (US); Brandon Johnson, Bozeman, MT (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/383,948

(22) Filed: Oct. 26, 2023

(65) Prior Publication Data
US 2025/0139077 A1  May 1, 2025

(51) Int. Cl.
| | | |
|---|---|---|
| G06F 16/00 | (2019.01) | |
| G06F 16/22 | (2019.01) | |
| G06F 16/23 | (2019.01) | |
| G06F 16/2457 | (2019.01) | |

(52) U.S. Cl.
CPC ...... *G06F 16/2358* (2019.01); *G06F 16/2282* (2019.01); *G06F 16/24573* (2019.01)

(58) Field of Classification Search
CPC .......... G06F 16/2358; G06F 16/24573; G06F 16/2282
See application file for complete search history.

(56) References Cited

U.S. PATENT DOCUMENTS

| | | | | |
|---|---|---|---|---|
| 9,519,673 | B2* | 12/2016 | Schreter | G06F 16/2379 |
| 2003/0220938 | A1* | 11/2003 | Norcott | G06F 16/217 |
| 2014/0136510 | A1* | 5/2014 | Parkkinen | G06F 16/901 |
| | | | | 707/711 |
| 2014/0258241 | A1* | 9/2014 | Chen | G06F 16/2365 |
| | | | | 707/683 |
| 2017/0139981 | A1* | 5/2017 | Wein | G06F 16/2322 |
| 2018/0246809 | A1* | 8/2018 | Rebholz | G06F 3/061 |

\* cited by examiner

*Primary Examiner* — Syed H Hasan
(74) *Attorney, Agent, or Firm* — Hickman Becker Bingham Ledesma LLP (57) ABSTRACT

As with database tables in general, a streaming table and its columns are defined within by a database. DML commands are issued against a streaming table that specify to insert rows and values into their defined columns. Change records in a change log (e.g., redo log) are generated to record the changes specified by DML commands. The change log may be used to stream data captured by the change log. However, unlike with database tables in general, the rows of a streaming table are not persistently stored in the database at commit time. Alternatively, rows are stored persistently but without values for columns defined as streaming columns. Columns defined as streaming columns may be set to values specified by DML commands but are not stored in the database; streaming column values are captured in change logs, however.

18 Claims, 5 Drawing Sheets

STREAMING CHANGE LOGS FROM STREAMING DATABASE TABLES

FIELD OF THE INVENTION

The present invention relates to streaming data from databases.

BACKGROUND

Database management systems (DBMSs) use change logs to capture data to stream to remote systems for replication, to other streaming systems, or to event management systems, where changing data can trigger various events. One way to generate a change log to capture data to stream is to create and populate a database table referred to herein as a "log-adjunct table". The primary purpose of a log-adjunct table is to be populated with data to stream so that the data to stream is captured in a change log from where the data is actually streamed.

There is a high cost associated with writing, storing, managing, and eventually deleting data in a log-adjunct table, though. Writing database changes to a log-adjunct table is costly, yet the data in the table often remains in the database without being queried, only to be deleted later on. Purging the data only adds to the significant overhead.

An example of a log-adjunct table is a field audit log table, which may be used to capture changes made by an application to columns of database tables. Change log records generated by populating the field audit log table are streamed to an external application for monitoring and compliance purposes. The rows once stored in log-adjunct able are rarely queried.

Maintaining detailed audit information may be necessary for business or compliance reasons. However, the sheer volume of data generated for a field audit table imposes an onerous overhead. For that reason, some DBMSs may limit use of a field audit table field to only a few tables.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present disclosure relates to an approach to streaming data that uses a new type of database table referred to as a streaming table. As with database tables in general, a streaming table and its columns are defined within a database. DML commands are issued against a streaming table that specify to insert rows and values into their defined columns. Change records in a change log (e.g., redo log) are generated to record the changes specified by DML commands. The change log may be used to stream data captured by the change log.

However, unlike database tables in general, the rows of a streaming table are not persistently stored in the database at commit time. Alternatively, rows are stored persistently but without values for columns defined as streaming columns. Columns defined as streaming columns may be set to values specified by DML commands but are not stored in the database; streaming column values are captured in change logs, however. These approaches maintain the database transactional context of reading from and writing to a database with the benefit of streaming data to external systems, but without the penalty of writing the data to persistent storage.

Streaming tables enable efficient partitioning by a DBMS between online analytical processing (OLAP) or online transactional processing (OLTP) functions and the capturing and streaming of changes to a database. For example, while a database transactional database system's primary responsibility is to process multitudes of database transactions against multiple tables using database transaction processing, the database transactional database system may also need to capture database transaction records, field audit records, or the like. Using streaming tables may allow the database transactional database system to use less resources to capture this data, leaving more resources to apply to its primary operations. Even more, further processing database transaction records, field audit records, or the like can be performed by some other, more capable or specialized system.

Using streaming tables may permit legacy applications that use log-adjunct tables to use streaming tables without significant reconfiguration of the legacy application. DML commands that were issued to log-adjunct tables can instead be issued against streaming tables, which may be simply log-adjunct tables redefined as streaming tables. This also obviates any need for these applications to be reprogrammed to directly interact with other streaming services to avoid the overhead attendant to log-adjunct tables.

Streaming Tables

Figure 1:
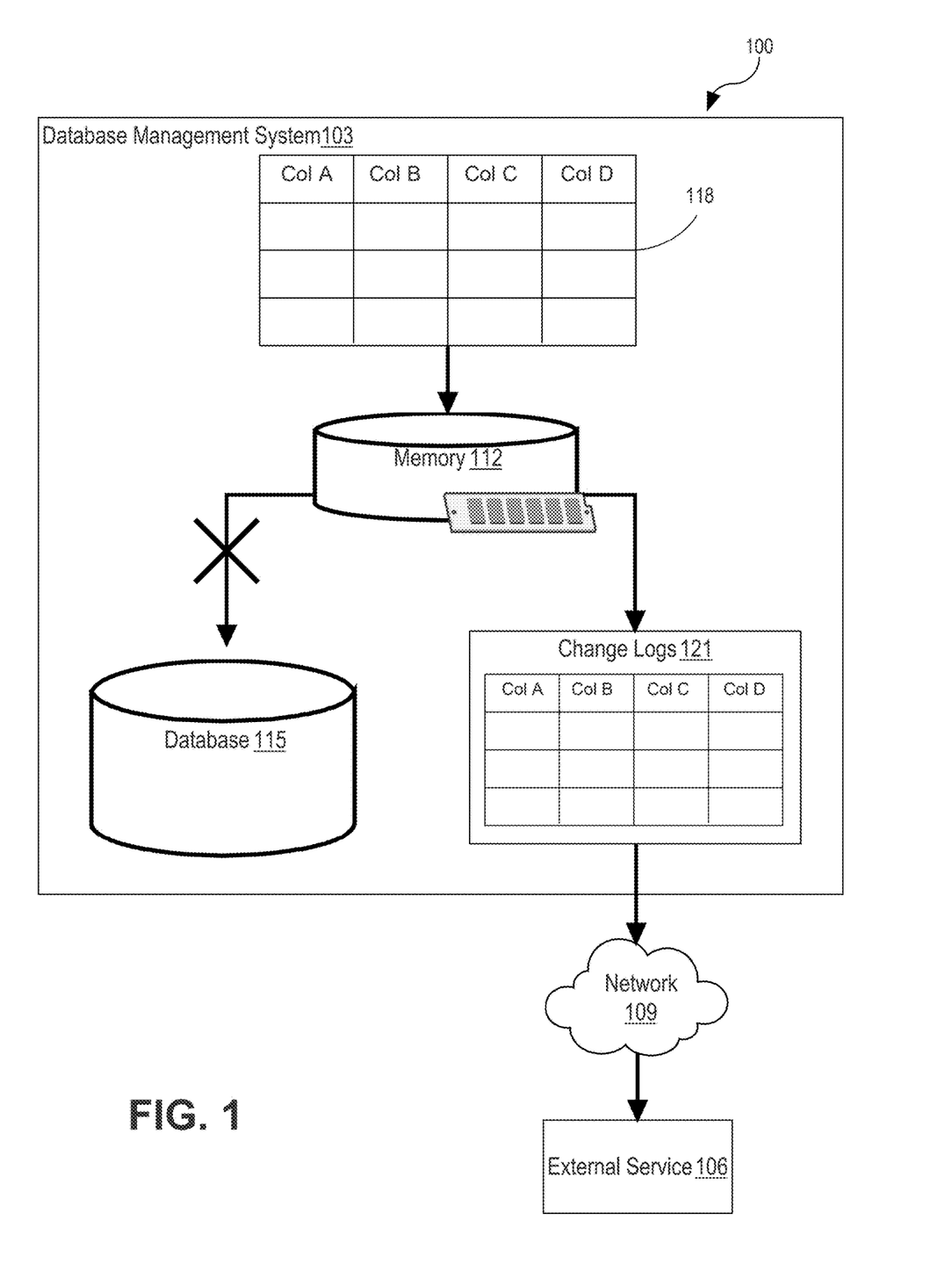
FIG. 1 is a block diagram illustrating an example system for streaming data using a streaming table.

FIG. 1 is a block diagram illustrating an example system 100 for streaming data using a streaming table, in an embodiment. The system 100 includes a DBMS 103 and an external service 106 in communication via a network 109.

The DBMS 103 includes a memory 112 and a database 115. The DBMS 103 may define streaming tables 118. The DBMS 103 may generate change log records in one or more change logs 121 to record data changes captured by data stored in a streaming table 118. The DBMS 103 may stream the change logs 121 to an external service 106 over the network 109. The DBMS 103 may operate one or more databases such as a relational database, a columnar database, or a document store.

A streaming table 118 is a database table that enables the streaming of data by insert database commands without storing the data in the database 115. Instead, the streaming table 118 and the data included therein are held in memory 112 until the corresponding database transaction is committed. When defining streaming table 118, in addition to specifying the schema properties of a database table—e.g., the table's name, the names and data types of the columns, the table's primary key, and other attributes—the table can be designated as "streaming." The DBMS 103 then generates metadata in a database dictionary defining the streaming table 118 that specifies the table as a streaming table 118, in addition to the other properties of the streaming table 118. In an embodiment, no data inserted by database commands issued against streaming table 118 may be persistently written to database 115. The streaming table 118 may therefore be considered a "metadata only" table.

When inserting data into a streaming table 118, rows representing the newly inserted data may be created in memory 112. Instead of writing this data to database 115 when committing a database transaction, writing data to database 115 is prevented or otherwise forgone. Thus, when a database transaction is committed, data included in the streaming table 118 may be streamed out to an external service 106 via change logs 121, and data may be purged from the streaming table 118 in memory 112. This outcome may be, in effect, the same as if data from the streaming table 118 were written to the database 115 and eventually deleted, but without incurring the costs of writing and deleting the data.

Writing data to database 115 may be prevented or foregone by preventing or foregoing database writes to store the inserted rows. The term "database write" is used to refer to operations to make changes to database content in data blocks stored in persistent storage by, inter alia, making a change to a copy of the data block in a database buffer. Ultimately, the copy of the data block may be stored as a new version of the data block in persistent storage. A database write does not necessarily include writing a data block to persistent storage. A database transaction may specify multiple database commands that each cause a separate database rewrite and separate redo and undo records for the same data block. When the data block is ultimately written to persistent storage, the new version of the data block may reflect the database writes.

In columnar databases, database writes may refer to writing database data in place in columnar storage comprising shared memory that is used to store columnar database data. A database transaction may store rows inserted into private memory used by a database transaction, however the rows are not written to columnar storage using database writes.

The change logs 121 may record data inserted into the streaming table 118. Each change log record in change log 121 may correspond to a single row in the streaming table 118. DBMS 103 may populate the streaming table 118 based on data changes as they occur, and, after the database transaction is committed, derive the change logs 121 from data stored in the streaming table 118.

If a database transaction inserts enough rows into the streaming table 118 to exceed a portion of memory 112 available to the database transaction, data from the streaming table 118 may be inserted into temporary tables until a commit operation is performed. Once the database transaction is committed, the data may be read from the temporary tables and used to create the change logs 121. But the data may still not be written to the database 115 by issuing database writes.

Once a database transaction is committed, change log records in change logs 121 generated by the database transaction for streaming table 118 may be streamed out to an external service 106 over the network 109.

The external service 106 may be a remote database system, a streaming system, an event management system, or another external system that may read, store, consume, or otherwise make use of change logs 121. The external service 106 may adapt its use of the change logs based on the external service's 106 particularized needs. For instance, the external service 106 may be a Kafka system, an Enterprise Messaging System, a Java Messaging System, or another stream-processing platform. The external service 106 may perform a number of actions using the change logs 121 such as, for example, replicating the DBMS 103 in a remote system; storing in a large repository like a data warehouse for auditing, reporting, or analysis; triggering events based on particular data changes reflected in the change logs 121; or training a machine learning model.

Operations on Streaming Tables

During a database transaction involving a streaming table 118, the data from the streaming table 118 may be cached in memory 112. In some implementations, the streaming table 118 may not be queried. In other implementations, for a database transaction inserting data into a streaming table 118, the DBMS 103 may support querying or other operations (e.g., dirty reads) executed by the database transaction with respect to the streaming table 118 while the data remains in memory 112, before the database transaction is committed. For example, uncommitted rows may be inserted by a database transaction into the streaming table 118 can be updated or deleted.

Once the corresponding database transaction is completed, however, the data may be purged from memory 112. Other database transactions may be unable to query the data under database transaction semantics; the other database transactions may be unable to see uncommitted changes made by the database transaction and, once committed, the changes are not be persisted.

In addition, the DBMS 103 may support performing a rollback operation for a database transaction, where the data from a streaming table 118 would be purged from memory 112. Likewise, any previous changes to the data in the streaming table 118 would not be recorded in the change logs 121. In some implementations, though, the metadata associated with a streaming table 118 may indicate that the streaming table 118 may not be rolled back. In that case, even if a rollback operation is performed, the data in that streaming table 118 is still emitted into change logs 121 and streamed to the external service 106.

Streaming Columns

Figure 2:
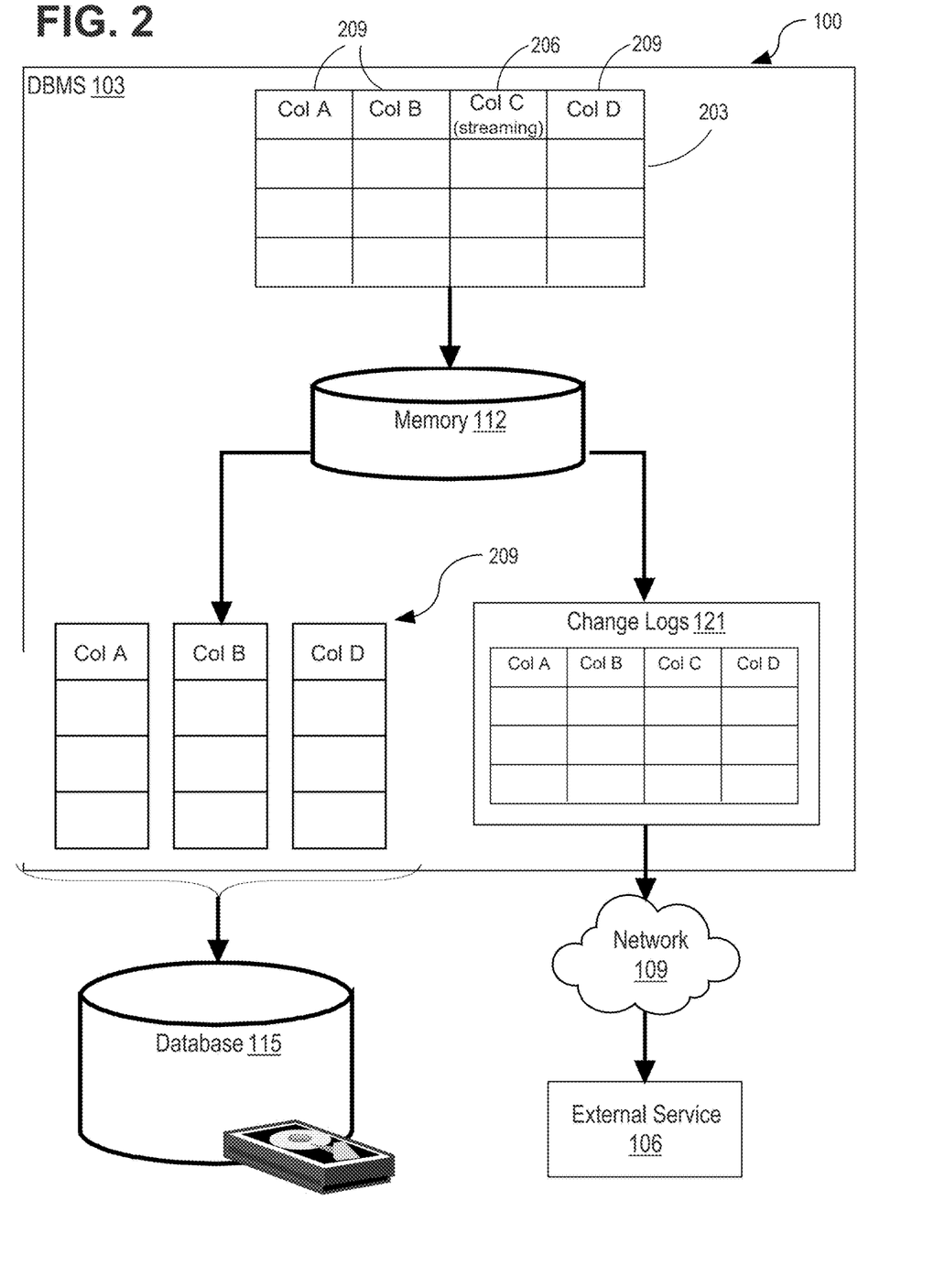
FIG. 2 shows another example of the system for streaming data using a streaming column.

FIG. 2 shows another example of the system 100 for streaming data using a streaming column. As in FIG. 1, the DBMS 103 includes the memory 112 and the database 115. In the example of FIG. 2, though, the DBMS 103 may define database tables 203 having one or more streaming columns 206 in addition to one or more non-streaming columns 209.

Like streaming tables 118, an individual column may also be designated as streaming column 206. When defining a database table 203, in addition to specifying the schema properties of the database table 203, one or more columns of the database table 203 may be defined as streaming columns. The DBMS 103 may then generate metadata in the database dictionary defining the database table 203 that, among other things, indicates one or more columns as streaming columns 206.

When the database transaction is committed, data from non-streaming columns 209 would be written to the database 115, while writing data from streaming columns 206 may be prevented or foregone. That is, when writing rows inserted into the database table 203 during a database transaction, the DMBS 103 may perform a database write that includes column values in those rows included in non-streaming columns 209, but the DBMS 103 does not include column values for streaming columns 206 in the database write. Still, change logs 121 generated by the DBMS 103 when the database transaction is committed would reflect data from the streaming columns 206. Thus, the streaming column 206 values would be captured in the change logs 121 and streamed out to the external system 106 over the network 109.

In the example of FIG. 2, while the non-streaming columns 209 "Col A", "Col B", and "Col D" would be written to the database 115, the DBMS 103 would prevent or forego writing data from the streaming column 206 the database 115. Still, the associated change log 121 streamed out to the external service 106 would reflect the entire database table 203, including column values from both the streaming column 206 and the non-streaming columns 209.

In some instances, there may not be sufficient reason to preserve a portion of the data in database table 203. For example, a few columns of database table 203 may include data that is much more storage-intensive than the other columns of database table 203. Thus, designating any such columns as streaming columns 206 may cause the DBMS 103 to prevent or forego writing data from the streaming columns 206 to the database 115, although the DBMS 103 may still write data from the other columns 209 of the database table 203 to the database 115.

Using streaming columns 206 may therefore decrease the capacity used to store the database table 203 and the computational overhead of writing the database table 203 to the database 115. This may be especially beneficial when some columns in a database table 203 include large amounts of data compared to other columns. The performance of the DBMS 103 may therefore be increased.

During a database transaction, the streaming columns 206 may still be accessible in memory 112. In some implementations, the DBMS 103 may support querying or other operations (e.g., dirty reads) executed by the database transaction with respect to the streaming columns 206 within the context of a database transaction.

When defining a database table 203, the columns associated with that table are defined based on given parameters, which may include the column's size and other properties of the column, whether the column is streaming or not, and a default value for the column. When a streaming column 206 is later targeted by a select query or other type of query, the default value for the streaming column 206 may be returned as if the default value were the value of that streaming column 206, even though the streaming column 206 is not persistently stored in the database 115 and may have even been purged from memory 112.

From the point of view of the database schema, the database table 203 would include both the streaming columns 206 and the non-streaming columns 209. For instance, a select query for the database table 203 would return both data from the non-streaming columns 209 and default values for the streaming columns 206. As an example, data in the non-streaming columns 209 would be persistently stored in the database 115, but data from the streaming columns 206 including their default values-would not be persistently stored in the database 115. The default values for streaming columns 118 may be stored as part of the metadata for the database table 203, not the database table 203 itself.

Example Application Involving Field Audit Log Tables

Figure 3:
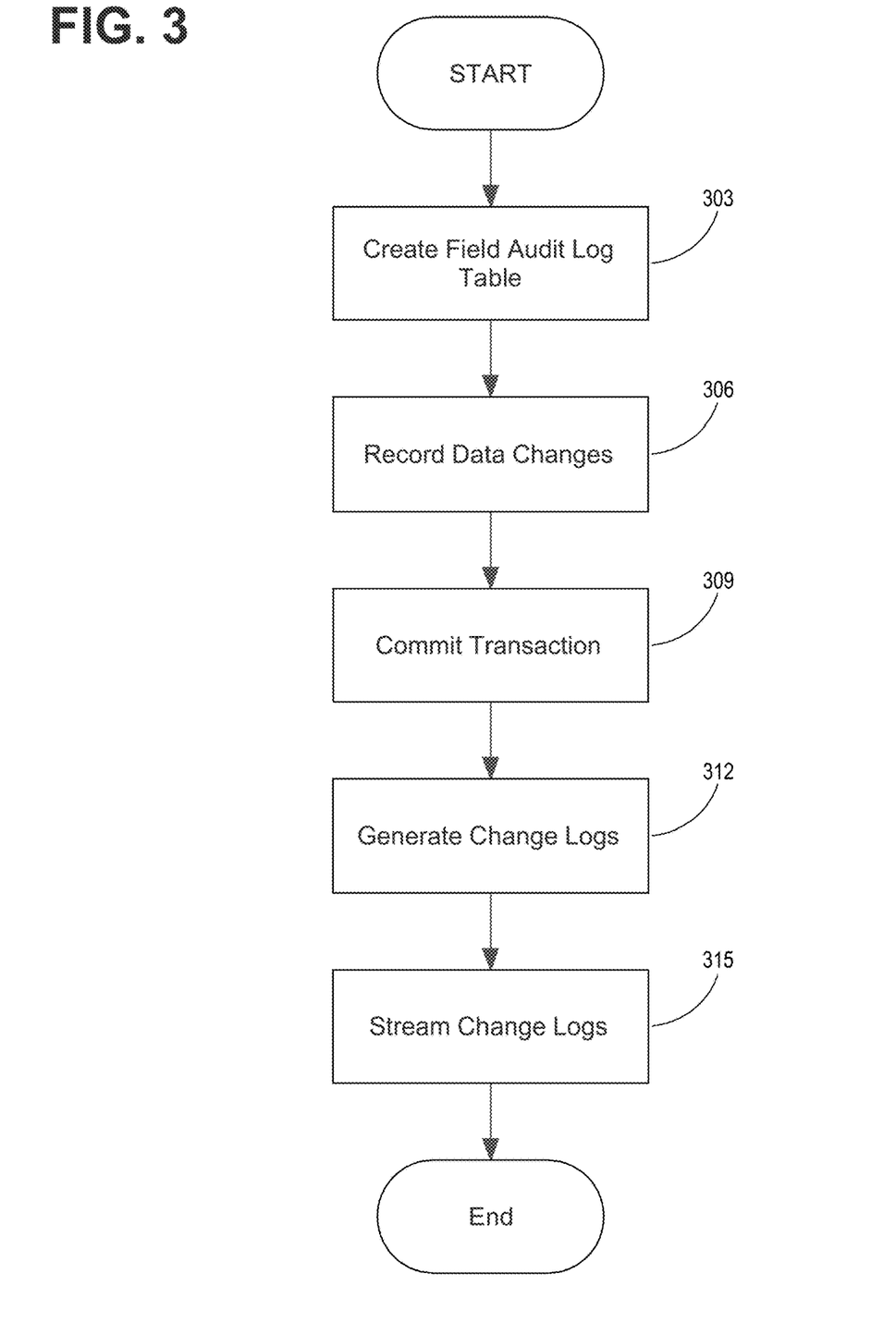
FIG. 3 is a flowchart that depicts an example method for streaming change logs generated from a field audit log table.

FIG. 3 is a flowchart that depicts an example method for streaming change log records generated for a field audit log table. The flow diagram of FIG. 3 provides merely an example of the many different types of functional arrangements that may be employed to implement the operation of the depicted method. As an alternative, the flow diagram of FIG. 3 may be viewed as depicting an example of elements of a method implemented within the system 100.

At step 303, a DBMS defines a field audit log table. The field audit log table may track and record changes to data in the DBMS. The field audit log table may be defined by specifying various properties of the table, including that the field audit log table is a streaming table. The DBMS may generate metadata in a database dictionary for the streaming table. The metadata may, among other things, indicate that the table is a streaming table.

At step 306, the DBMS records in the field audit log table one or more data changes to data in the database. The one or more data changes may be part of a database transaction. As an example, the field audit log table can record changes of an object made by create, read, update, delete (CRUD) application programming interfaces (APIs). For example, an update of one or more fields of a record may be recorded as a database transaction by the DBMS.

At step 309, the DBMS commits the database transaction. When the database transaction is committed, data stored in the field audit log table may be purged from memory. The DBMS may then prevent or forego writing the data from the field audit log table to persistent storage. For example, instead of performing a database write, the DBMS can simply end the write operation triggered by the database transaction commit without in fact writing data to persistent storage.

At step 312, the DBMS generates one or more change log records. The one or more change log records may record data changes recorded in the field audit log table during the database transaction. In this example, the one or more change log records may be derived from the records stored in the field audit log table. In some examples, however, the one or more change log records may be generated directly from the one or more data changes, before the database transaction is committed.

In an embodiment, change log records are generated in response to DML commands issued against a table (e.g. the field audit log table) in a database transaction. The change log records are stored in a change log buffer by a database process that is executing within the database transaction. One or more other database processes (e.g. daemon processes not executing within any particular database transaction) asynchronously write change log records in the buffer to persistent storage. At commit time of a database transaction, the DBMS determines whether change log records written to the change log buffer have been persistently stored before completing commitment of the database transaction.

The determination may entail checking metadata about the change log buffer that specifies that all change log records for database transactions committed or otherwise terminated at and/or before a particular time or SCN have been stored persistently.

In an embodiment where change log records generated for a database transaction are written to persistent storage in response to a request and/or determination to commit the database transaction, determining the change log records are stored persistently may simply be a determination that storage operations executed by the database transaction to persistently store the change log records are completed.

At step 315, the DBMS streams the one or more change log records to an external service. As an example, the DBMS may transmit the one or more change log records to the external service over a network. The external service may be a remote DBMS, a streaming system, an event management system, or other external system that consumes the one or more change logs.

DBMS Over View

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snapshot time of the query. The DBMS determines which undo records to apply to a data block based on the respective logical times associated with the undo records.

When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, A branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the pre-pare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. java file) and the compiled version of the class (i.e. class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
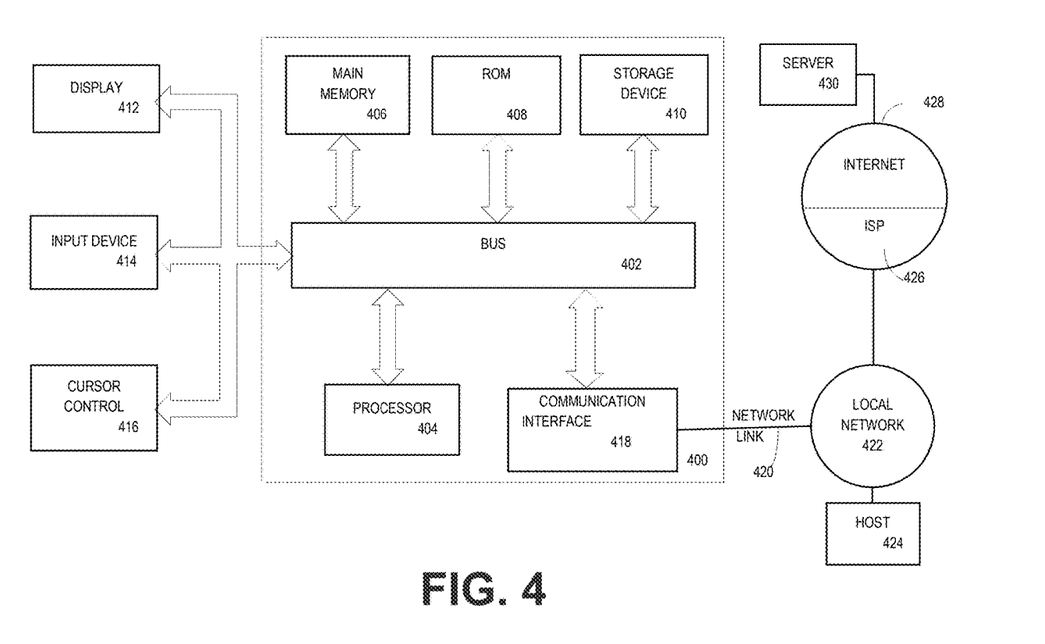
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
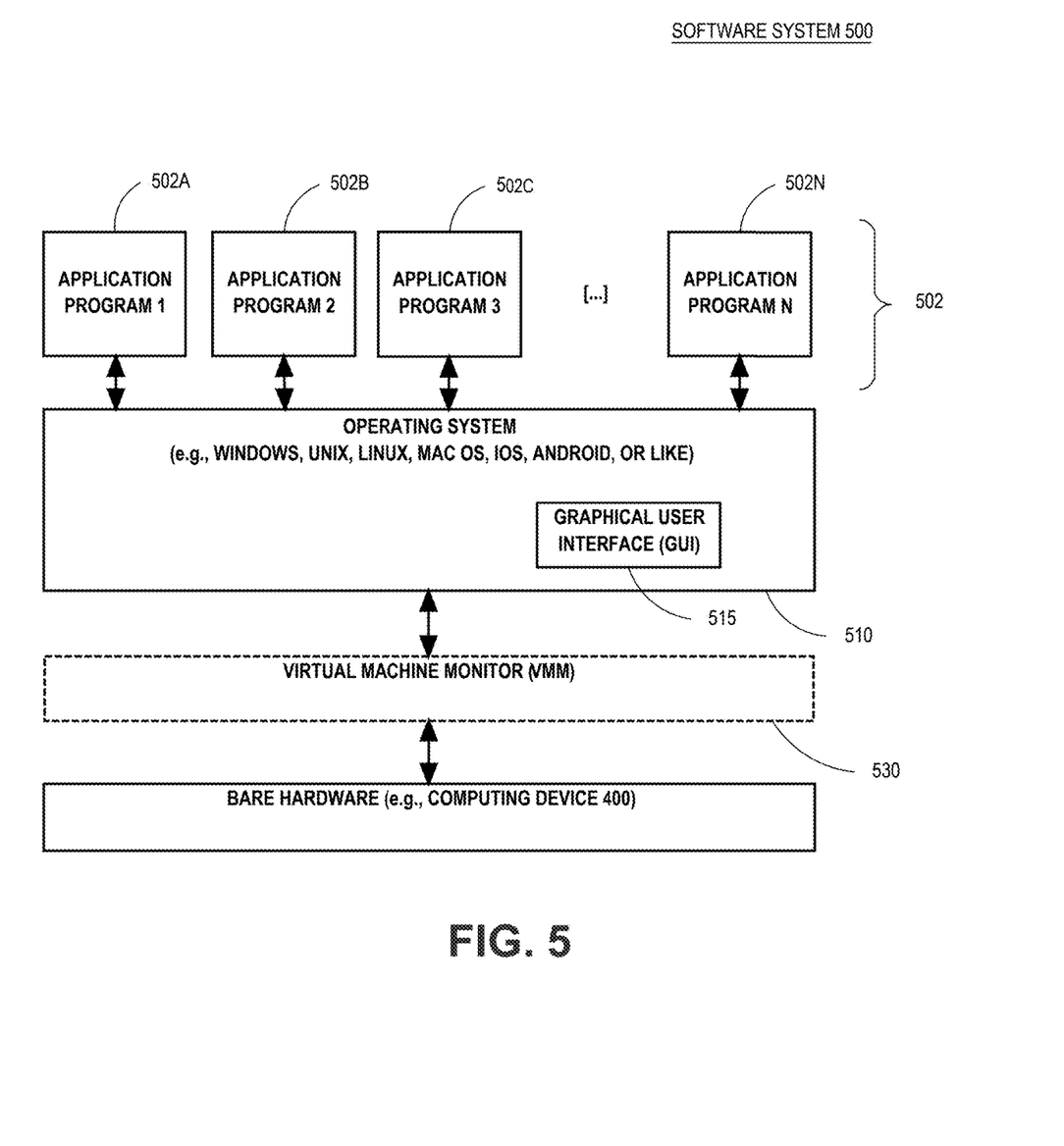
FIG. 5 is a block diagram of a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   within a database hosted by a database management system (DBMS), defining a database table as a streaming table;
   within a database transaction, receiving one or more database commands to insert first rows into the streaming table;
   generating change log records in a change log recording insertion of said first rows;
   committing said database transaction, wherein committing said database transaction includes:
      determining that said change log records are stored persistently in a change log; and
      purging said first rows from memory;
   wherein said DBMS prevents performing database writes that persistently store said first rows in a data block of the database,
   wherein the method is performed by one or more computing devices.

2. The method of claim 1, further comprising causing the change log records to be streamed to an external system over a network.

3. The method of claim 1, wherein defining the database table as a streaming table further comprises:
   generating metadata in a data dictionary defining the database table, wherein the metadata indicates that the database table is a streaming table.

4. The method of claim 1, further comprising:
   receiving a query within the database transaction specifying the first rows from the database table in an instance in which the database transaction has not yet been committed; and
   providing data from the first rows in response to the query.

5. The method of claim 1, further comprising:
   receiving a query specifying the first rows from the database table in an instance in which the database transaction has been committed; and
   providing an error message in response to the query.

6. A method comprising:
   within a database hosted by a database management system (DBMS), defining a database table comprising a plurality of columns, and the plurality of columns comprising one or more streaming columns and one or more other columns;
   within a database transaction, receiving one or more database commands to insert first rows into the database table;
   generating change log records in a change log recording insertion of the first rows;
   committing the database transaction, wherein committing the database transaction includes,
   determining that said change log records are stored persistently in a change log;
   purging said first rows from memory;
   persistently storing, in the database, one or more values of the one or more other columns in the first rows; and
   the DBMS preventing persistently storing one or more values of the one or more streaming columns in the first rows.

7. The method of claim 6, further comprising:
   providing one or more default values for the one or more streaming columns; and
   in response to a query specifying the one or more streaming columns, providing the one or more default values.

8. The method of claim 6, further comprising:
   causing the change log records to be streamed to an external system over a network.

9. The method of claim 6, further comprising:
   generating metadata in a data dictionary defining the database table, wherein the metadata indicates the one or more streaming columns as streaming columns.

10. One or more computer-readable non-transitory media storing one or more sequences of instructions that, when executed by computing devices, cause:
    within a database hosted by a database management system (DBMS), defining a database table as a streaming table;
    within a database transaction, receiving one or more database commands to insert first rows into the streaming table;
    generating change log records in a change log recording insertion of said first rows;
    committing said database transaction, wherein committing said database transaction includes:
       determining that said change log records are stored persistently in a change log; and
       purging said first rows from memory;
    wherein said DBMS prevents performing database writes that persistently store said first rows in a data block of the database,
    wherein the one or more computer-readable non-transitory media is performed by one or more computing devices.

11. The one or more computer-readable non-transitory media of claim 10, wherein the one or more sequences of instructions include instructions, that when executed by one or more processors cause the change log records to be streamed to an external system over a network.

12. The one or more computer-readable non-transitory media of claim 10, wherein defining the database table as a streaming table further comprises:
generating metadata in a data dictionary defining the database table, wherein the metadata indicates that the database table is a streaming table.

13. The one or more computer-readable non-transitory media of claim 10, wherein the one or more sequences of instructions include instructions, that when executed by one or more processors cause:
receiving a query within the database transaction specifying the first rows from the database table in an instance in which the database transaction has not yet been committed; and
providing data from the first rows in response to the query.

14. The one or more computer-readable non-transitory media of claim 10, further comprising:
receiving a query specifying the first rows from the database table in an instance in which the database transaction has been committed; and
providing an error message in response to the query.

15. One or more computer-readable non-transitory media storing one or more sequences of instructions that, when executed by computing devices, cause:
within a database hosted by a database management system (DBMS), defining a database table comprising a plurality of columns, and the plurality of columns comprising one or more streaming columns and one or more other columns;
within a database transaction, receiving one or more database commands to insert first rows into the database table;
generating change log records in a change log recording insertion of the first rows;
committing the database transaction, wherein committing the database transaction includes,
determining that said change log records are stored persistently in a change log;
purging said first rows from memory;
persistently storing, in the database, one or more values of the one or more other columns in the first rows; and
the DBMS preventing persistently storing one or more values of the one or more streaming columns in the first rows.

16. The one or more computer-readable non-transitory media of claim 15, wherein the one or more sequences of instructions include instructions, that when executed by one or more processors cause:
providing one or more default values for the one or more streaming columns; and
in response to a query specifying the one or more streaming columns, providing the one or more default values.

17. The one or more computer-readable non-transitory media of claim 15, wherein the one or more sequences of instructions include instructions, that when executed by one or more processors cause:
causing the change log records to be streamed to an external system over a network.

18. The one or more computer-readable non-transitory media of claim 15, wherein the one or more sequences of instructions include instructions, that when executed by one or more processors cause:
generating metadata in a data dictionary defining the database table, wherein the metadata indicates the one or more streaming columns as streaming columns.

\* \* \* \* \*